May 15, 1956 B. W. ANDRUS 2,745,297
REVERSIBLE SPEED CHANGER
Filed Jan. 28, 1953
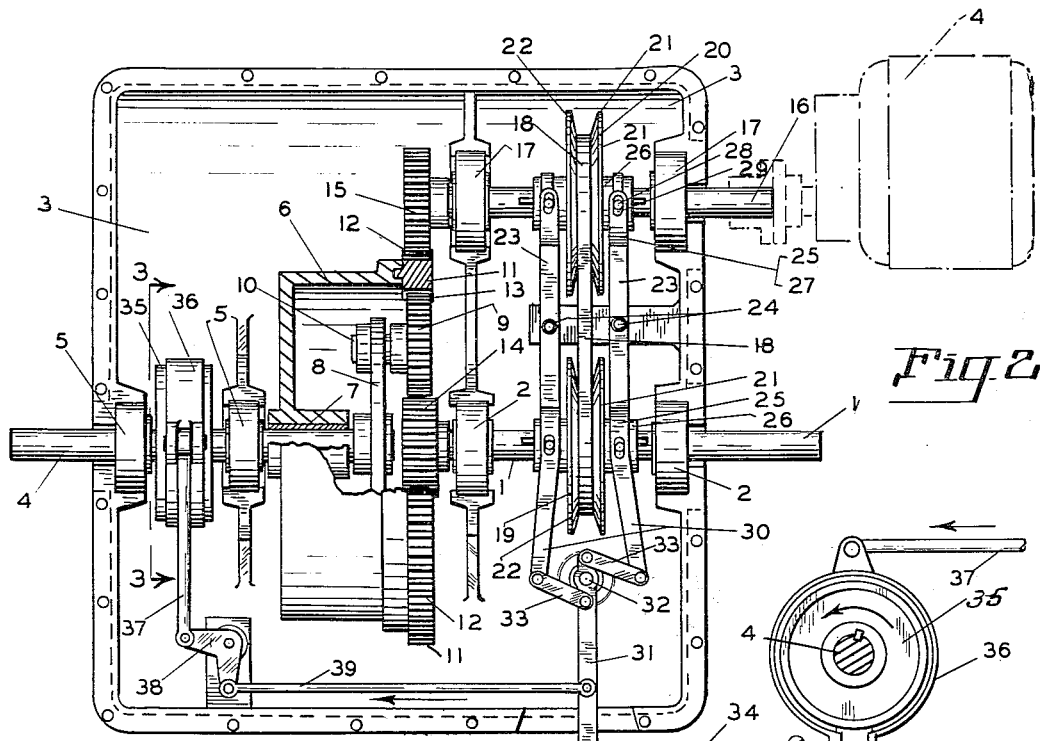
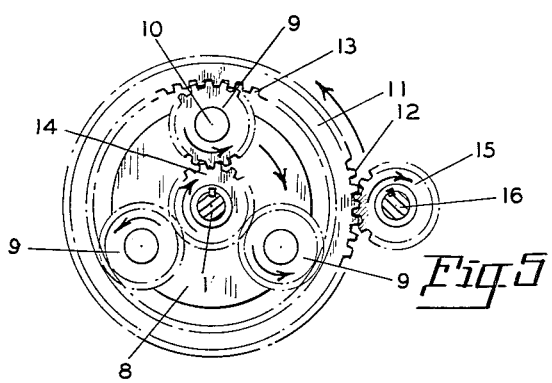
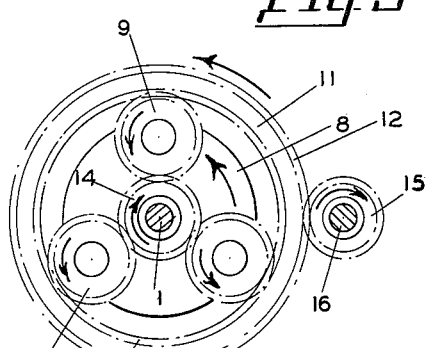
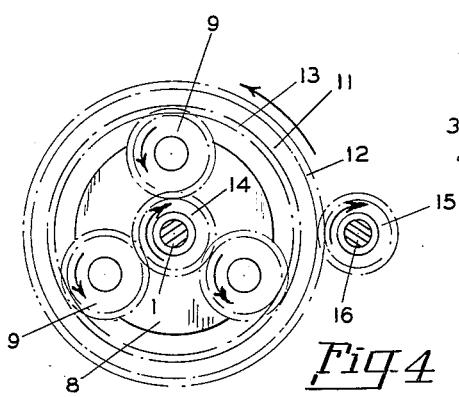
INVENTOR.
BUDD W. ANDRUS
BY
ATTY.

United States Patent Office 2,745,297
Patented May 15, 1956

2,745,297
REVERSIBLE SPEED CHANGER
Budd W. Andrus, Eugene, Oreg.

Application January 28, 1953, Serial No. 333,650

4 Claims. (Cl. 74—689)

This invention relates to reversible speed changers and is particularly adapted to the operation of sawmill carriages and the like.

The primary object of the invention is to provide a speed changer that will adapt itself to any speed reduction from zero in either direction by a simple control mechanism.

Another object of the invention is to provide means for automatically returning the same to neutral in case of human error or breaks in automatic control.

With my new and improved reverse and speed changer, it is possible to drive a driven shaft in either direction without reversing the direction of the driving shaft on changing the speed of the driving shaft.

These and other incidental objects will be apparent in the drawings, specification and claims.

Referring to the drawings:

Figure 1 is an end view of my new and improved reverse and speed changing device.

Figure 2 is a plan view of Figure 1, with the cover plate removed and parts broken away for convenience of illustration.

Figure 3 is a detail fragmentary sectional view of the driven shaft and the automatic friction mechanism for returning the speed reducer to a neutral condition.

Figure 4 is an end view of the reversing and speed reducing gear changer, illustrating the same in neutral position, taken on line A—B of Figure 2.

Figure 5 is the same as Figure 4, except that the speed changing countershaft is shown travelling at a slower rate of speed than the drive shaft, thereby causing the driven shaft to travel in the direction indicated.

Figure 6 is the same as Figures 4 and 5, except that the countershaft is travelling at a higher rate of speed than the drive shaft, reversing the driven shaft.

Referring more specifically to the drawings:

My new and improved reversing and speed changer consists of a driving shaft 1 journalled within bearings 2, which are mounted to the casing or frame 3 in the usual manner. A driven shaft 4 is journalled within bearings 5 mounted within the casing or frame 3. A drum or spider 6 is rotatably mounted on the driven shaft 4 by the sleeve bearing 7.

Keyed to the inner end of the shaft 4 is a disk 8, to which the spur gears 9 are journalled by way of the stub shafts 10. Fixedly secured to the drum or spider 6 is a ring gear 11, having teeth 12 formed on its outer periphery and teeth 13 on its inner periphery. The spur gears 9 mesh with the teeth 13 and also with a driving spur gear 14 which is keyed to the driving shaft 1.

A speed changing spur gear 15 meshes with the teeth 12 of the ring gear 11 and is keyed to the countershaft 16, which is journalled within bearings 17 in the casing 3. The countershaft 16 is driven by way of the V-belt 18 from the adjustable pulley 19, which is slidably keyed to the driving shaft 1. A second adjustable V-pulley 20 is slidably keyed to the countershaft 16. The flanges 21 and 22 of the adjustable V-pulleys 19 and 20 are moved away and towards one another to vary the effective diameter of the pulleys. This movement of the pulley flanges is effected by the action of the levers 23, which are pivotally connected to the casing 3 at 24.

The ends of these levers 23 are forked at 25 and are connected to the hubs 26 by way of the yokes 27 operating within annular grooves formed on the hubs 26. The yokes have the usual stub shafts 28 cooperating with the slots 29 formed on the bifurcated ends of the levers 23. This is all well known structure.

The levers are extended at one of their ends as indicated at 30 and are adapted to be moved towards and away from one another by the control lever 31, which is pivotally connected to the casing 3 at 32 and to the extensions 30 by the connecting links 33. Assuming that the lever 31 is moved in the direction of the arrow, it will pull the extensions 30 together, pivoting the levers 23 about their pivots 24. This will move the flanges 21 and 22 of the pulley 20 further apart, and it will close the flanges 21 and 22 of the pulley 19 closer together. This will case the V-belt 18 to assume a greater diameter within the pulley 19 than that of the pulley 20, thereby increasing the speed of the countershaft 16 relative to the driving shaft 1.

This action is indicated in Figure 6, wherein the speed of the ring gear 11 in the direction of the arrow will be increased. This will cause the lineal rate of speed of the teeth 13 to be greater than the lineal rate of speed of the teeth on the spur gear 14, therefore the spur gears 10, together with the disk 8 travel in the direction of the arrow, rotating the driven shaft 4 at a speed depending upon the difference of speed between the driving shaft 1 and the countershaft 16, therefore the further the lever 31 is moved in the direction of the arrow, the greater will be the speed of the driven shaft in the direction indicated. The lever 31 may be directly operated by hand, or it may be moved by a control rod 34 from any suitable remote operating means.

When the driven shaft 4 is rotated, it will rotate the drum 35, which is keyed to the same, in the same direction of rotation. Surrounding the drum 35 is a brake shoe 36. The rotation of the drum 35 tends to pull the shoe with the same. The object of this is to continually tend to return the control lever 31 to its neutral position as shown in the drawings. The pull of the brake shoe 36 will pull the connecting rod 37 which will rotate the bell crank 38 so as to pull the rod 39 in the direction of the arrow. If for any reason the operator should forget to return the lever 31 to neutral, this continuous pull by the brake shoe 36 will return the said lever to the neutral position.

When the lever is in the neutral position, the countershaft 16 will be rotating at the same rate of speed that the driving shaft rotates, due to the fact that the belt diameter on both the pulleys 19 and 20 will be the same due to the adjustment of the said pulleys through the lever 23 and the lever 31. When the rotation of the driving shaft stops, the pull on the brake shoe 36 will stop, therefore the pull on the connecting rod 37 will cease, together with the rod 39 allowing the lever 31 to remain as shown in the drawings.

Referring to Figure 4, when in the neutral position the speed of the driving gears 14 and 15 will be the same, rotating the ring gear 11 at a speed that will allow the spur gears 9, together with the disk 8 to remain stationary, thereby not revolving the driven shaft 4.

In order to reverse the rotation of the driven shaft 4, the lever 31 is moved in the direction opposite to the arrow, which will move the flanges 21 and 22 of the V-belt pulleys 19 and 20 to a position to reduce the diameter of the belt 18 on the drive shaft 1 and increase its diameter on the countershaft. This will slow the countershaft down, reducing the speed of rotation of the ring gear 11, together with its teeth 13 meshing with the teeth of the spur gears 10, therefore the speed of the teeth 13 will be slowed down, while the speed of the teeth on the driving gear 14 will be faster.

This will cause the disk 8 to revolve in the direction of the arrow in Figure 5, or in the reverse direction of that illustrated in Figure 6. The amount of speed being governed by the position of the lever 31. The pull on the brake shoe 36 will be in the reverse direction, which will exert a pressure on the connecting rod 37 in the opposite direction to the arrow, tending to move the lever 31 back to its neutral position as shown, in case of operational failure of returning the lever 31 to neutral.

I have not attempted to go into any great detail on the structure of the variable pulleys 19 and 20, because this is an old principle. The same result could be obtained by mounting a variable speed motor to the countershaft 16 as indicated by the broken lines 40, Figure 2. By my new and improved method of reversing and speed changing, the driving shaft can be driven at a constant speed and a change of speed can be had in either direction from zero on up, depending upon the differences of speed existing between the driving shaft and the countershaft. In the operation of sawmill carriages especially, this is of great importance. This eliminates the slipping of belts, clutches and the like and eliminates sudden starting and stopping shocks.

What is claimed is:

1. A reversible speed changer comprising a drive shaft, a driven shaft, a planetary gear system between said shafts and including two concentric gears with a planet gear therebetween and meshing therewith, said planet gear being journalled on a carrier fixed with said driven shaft, one of said concentric gears being a sun gear fixed with said drive shaft and the other concentric gear being an internal ring gear floatingly supported and including an external spur-type gear, a countershaft, a spur gear fixed with said countershaft and meshing with said external spur-type gear, a variable speed drive means connected between said shaft and said countershaft for selectively driving said shafts through a range of both increasing and decreasing speeds, said variable speed drive means including control means for selectively regulating the speed transmitted between said drive shaft and said countershaft, and mechanism connected with said control means and responsive to rotation of said driven shaft in either direction to urge said control means to establish unity of transmission with said counter and drive shafts rotating at the same speed.

2. A reversible speed changer comprising a drive shaft, a driven shaft, a planetary gear system between said shafts and including two concentric gears with a planet gear therebetween and meshing therewith, said planet gear being journalled on a carrier fixed with said driven shaft, one of said concentric gears being a sun gear fixed with said drive shaft and the other concentric gear being an internal ring gear floatingly supported and including an external spur-type gear, a countershaft, a spur gear fixed with said countershaft and meshing with said external spur-type gear, a variable speed drive means connected between said drive shaft and said countershaft for selectively driving said shafts through a range of both increasing and decreasing speeds, said variable speed drive means including control means for selectively regulating the speed transmitted between said drive and said counter shaft, and mechanism connected with said control means and responsive to rotation of said driven shaft in either direction to urge said control means to establish unity of transmission with said counter and drive shafts rotating at the same speed, said control means including a movable control member, and said mechanism comprises a follower frictionally engaged with said driven shaft to be responsive to the speed and direction of rotation of said shaft, and means connecting said follower and said movable control member to urge said control member to neutral position.

3. A reversible speed changer as set forth in claim 2, wherein said transmission comprises a pair of V-pulleys respectively secured on said drive and counter shafts and a belt trained around said pulleys, said pulleys each comprising a pair of pulley flanges respectively movable relative to each other in an axial direction to vary the effective radius of said belt about each pulley, and means coupled between a corresponding flange of each pulley for simultaneously moving said flanges in an opposite sense relative to their respective cooperative flanges.

4. A reversible speed changer as set forth in claim 3 wherein said drive and counter shafts are parallel and said flange coupling means is coupled between both corresponding flanges of said pulleys and comprises a pair of levers disposed on opposite sides of said pulleys, said levers being pivotally mounted centrally between said drive and counter shafts and coupled adjacent their ends respectively to the corresponding flanges of the respective pulleys, and said control means includes a rotor pivotally responsive to movement of said control member, and a pair of links pivotally mounted at one end on opposite sides of said rotor and at the other end connected to one end of the levers respectively.

References Cited in the file of this patent

UNITED STATES PATENTS

| 1,311,577 | Rackstraw | July 29, 1919 |
| 1,702,627 | Bronander | Feb. 19, 1929 |
| 1,913,118 | Jacobsen | June 6, 1933 |
| 2,443,075 | Locke | June 8, 1948 |
| 2,446,462 | Dodge | Aug. 3, 1948 |

FOREIGN PATENTS

| 326,314 | Great Britain | Mar. 13, 1930 |
| 821,309 | Germany | Nov. 15, 1951 |
| 911,705 | France | July 18, 1946 |